Aug. 27, 1968  B. G. FORE  3,398,539
LAWN AND GARDEN-SURFACE WATER DEFLECTORS
Filed April 29, 1966
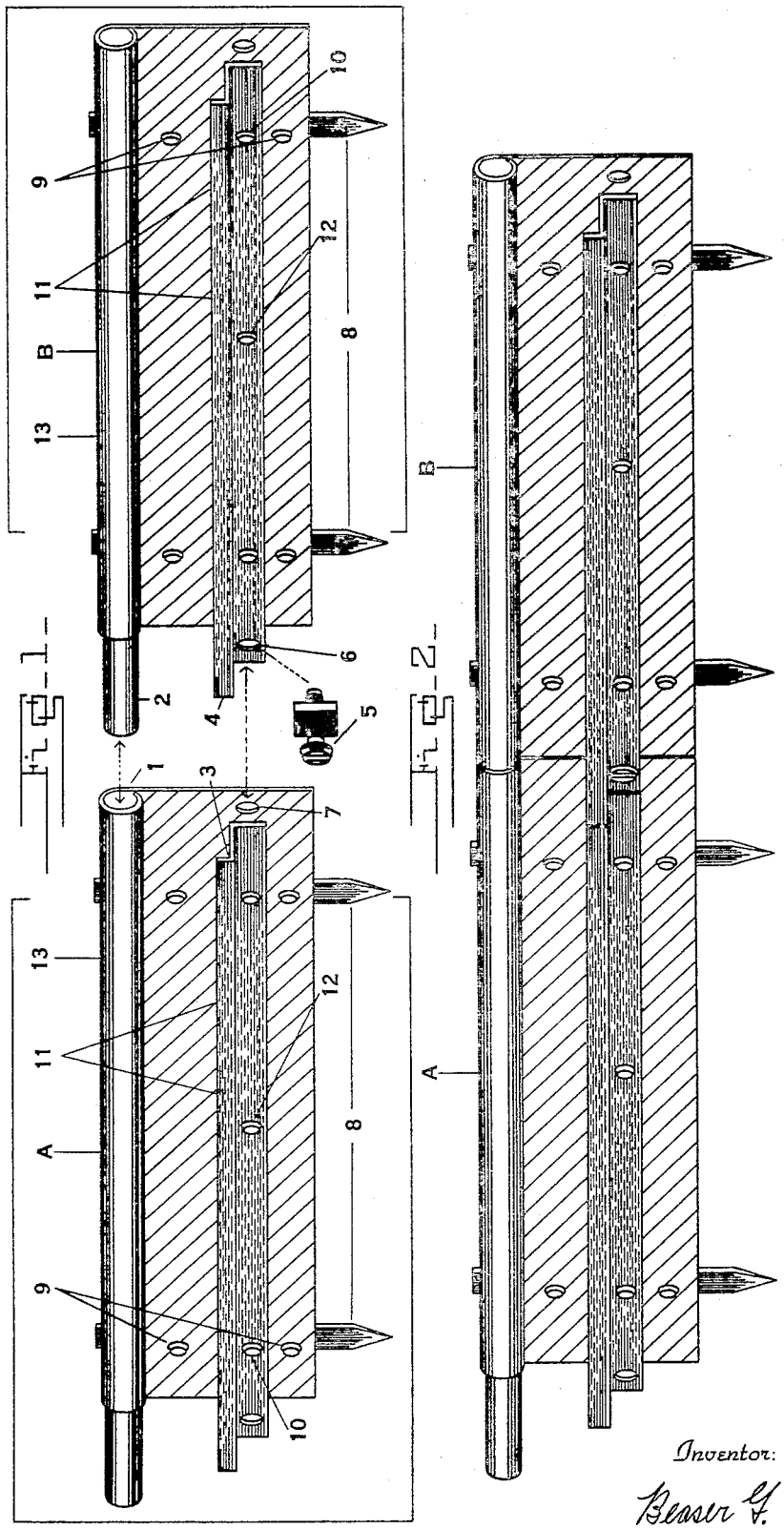
Inventor:
Beaver G. Fore United States Patent Office 3,398,539
Patented Aug. 27, 1968

3,398,539
LAWN AND GARDEN-SURFACE
WATER DEFLECTORS
Beaser G. Fore, P.O. Box 181, Brookneal, Va. 24528
Filed Apr. 29, 1966, Ser. No. 546,449
1 Claim. (Cl. 61—2)

ABSTRACT OF THE DISCLOSURE

A surface water deflector assembly wherein a plurality of sections are placed end to end and into the soil in upright position. The sections are provided with channels that are flush with the soil surface and are joined end to end to receive surface water flowing on one side of the assembly to thereby protect the soil on the other side of the assembly from such water flow.

---

The present invention relates to improvements in surface water deflectors and more particularly to an improved upright deflector in one or more sections with each section being alike and having a channel attached to the side for trapping and removal of an excessive amount of surface water that is caused by a heavy down pour of rain, or the rapid melting of snow and ice, that would wash the top soil off or leave a rutted surface.

An important object of the invention is to provide a deflector that is very effective for this purpose, inexpensive, easy to install and durable.

Another object of the invention is to prevent surface water from entering the basement of a dwelling having a lawn that is sloped toward the building and is below the street or road surface. The deflector may be set in the lawn between the building and the street or road at any desired left or right angle so that the water may enter the channel and is carried off to the side before it reaches the building.

On a newly sown lawn that is down grade, there is no prevention from the soil being washed off, in the event of an excessive down pour of rain. The invention may be set in the soil every twelve feet apart to the street or road and left there, until the grass has developed a sod that would withstand these conditions, at which time it may be removed. The grass will cover the narrow imprint made by the deflector in a short period of time.

The invention is equally effective for a garden to prevent soil and fertilizer from being washed away from and around young vegetable plants. The deflector may be placed at the outer edge of the garden, where the surface water would enter and be taken off before it enters the garden.

Still another object of the invention would be to divert surface water away from a plant bed, and particularly a tobacco plant bed that is usually located on an incline. The deflector to be set in the soil at the upper edge of the bed where the water would enter the channel and would be taken off to either side.

The invention may be used in many places for the disposal of unwanted surface water and will eliminate the use for unsightly ditches or furrows that would be a problem to dispose of at a later date.

The invention is to be made of any suitable material, such as sheet aluminum, a plastic material, or galvanized sheet metal. I would prefer aluminum, as this metal will stay bright and it is durable and will look good on the lawn of any dwelling or public building. The invention is simple and would be inexpensive and very easy to manufacture.

Other objects and advantages of the invention will become apparent during the course of the following detailed description taken in connection with the accompanying drawing, forming a part of this specification and in which drawing:

FIG. 1 is a side view of my surface deflector in two sections, A and B drawn at a 20 degree left angle to show clarity, and numbers from one to thirteen for identifying each part or portion and how it is fitted together. It is to be made in one or more sections and each section may be attached to the corresponding section. It is to be made in any desired dimensions. The small shaft 2 of B section is secured into the rolled tubular edge with solder or by welding, it is then inserted in the rolled tubular edge 1 of A section to insure alignment. The water channel 4 of B section is then flush with channel 3 of A section and is secured by inserting small bolt 5 through holes 6 and 7 and applying the nut to the bolt.

Both sections A and B are now attached and may be set down into the soil in an upright position, with the top edge of the water channel 11 flush with the surface of the soil and secured with sharpened posts 8 and bottom portions of both sections A and B down in the soil.

Numerals 9 are rivets for attaching posts to sections, 10 are rivets for attaching channel and posts to sections and 12 is a rivet for attaching the channel to the middle of each section, one or more rivets may be used for this purpose. The rolled edge 13 at the top of each section is a safety feature to prevent cutting damage, in the event that any one should fall upon it.

FIG. 2 is a side view of the invention in two sections, drawn at a 20 degree left angle shown fitted together, as it appears ready to be used.

I claim:
1. A surface water deflector assembly comprising a plurality of elongated upright sections partially buried in soil and connected end to end in series to divert surface water away from a selected area, each section comprising an elongated panel having pointed earth penetrable means depending from the lower portion thereof, an elongated Z-shaped member extending lengthwise of said panel and having one leg abuttingly secured to the panel along the face thereof opposite the face directed towards said selected area, the other leg of said Z-shaped member directed upwardly in spaced relation to said panel and defining a channel therebetween, one end of the member extending beyond one end of the panel and overlapping the other end of an adjacent panel in said series, said one end of the member abutting the other end of the member of the adjacent panel to define a continuous channel along the series of said sections, and the lower portion of each panel of the sections being embedded in the soil to a depth whereby the top edge of said other leg defining said channel is substantially flush with the surface of the soil to thereby receive surface water thereover and the channel diverts water away from said selected area.

References Cited

UNITED STATES PATENTS

| | | | |
|---|---|---|---|
| 1,852,268 | 4/1932 | Schmidt | 61—2 |
| 2,157,671 | 5/1939 | Payne | 61—29 |
| 2,178,863 | 11/1939 | Pepper | 61—35 |
| 2,210,218 | 8/1940 | Ramsey | 61—35 |

FOREIGN PATENTS 94,866  11/1962  Denmark.

EARL J. WITMER, *Primary Examiner.*